(12) United States Patent
Sugiura et al.

(10) Patent No.: US 7,922,904 B2
(45) Date of Patent: Apr. 12, 2011

(54) UPWARD-FLOW MANGANESE CONTACT COLUMN

(75) Inventors: Kiyotaka Sugiura, Hekinan (JP);
Hideki Takeuchi, Chita-Gun (JP);
Hiroyuki Oyachi, Handa (JP)

(73) Assignee: Metawater Co., Ltd., Tokyo (JP)

( * ) Notice: Subject to any disclaimer, the term of this patent is extended or adjusted under 35 U.S.C. 154(b) by 648 days.

(21) Appl. No.: 11/923,830

(22) Filed: Oct. 25, 2007

(65) Prior Publication Data

US 2008/0110817 A1    May 15, 2008

(30) Foreign Application Priority Data

Nov. 14, 2006    (JP) .................................. 2006-307708

(51) Int. Cl.
*C02F 1/64* (2006.01)
*B01J 23/34* (2006.01)
(52) U.S. Cl. ........ 210/285; 210/286; 210/289; 210/292; 210/502.1
(58) Field of Classification Search .................. 210/291, 210/292, 661, 722, 763, 285, 286, 289, 502.1; 422/140
See application file for complete search history.

(56) References Cited

U.S. PATENT DOCUMENTS

| 4,115,929 A | 9/1978 | Staub et al. |
| 4,257,171 A | 3/1981 | Johnson et al. |
| 4,551,254 A * | 11/1985 | Imada et al. .................. 210/688 |
| 4,574,496 A | 3/1986 | Sedlacek |
| 4,648,969 A * | 3/1987 | Swanson ....................... 210/237 |
| 4,764,347 A | 8/1988 | Milligan |
| 4,841,884 A | 6/1989 | Engstrom et al. |

FOREIGN PATENT DOCUMENTS

| EP | 0 894 526 A1 | 2/1999 |
| EP | 1 095 911 A1 | 5/2001 |
| GB | 1 431 763 A | 4/1976 |
| JP | 07-039872 A1 | 2/1995 |
| JP | 11-277076 A1 | 10/1999 |
| JP | 2003-103275 A1 | 4/2003 |
| JP | 2003-251370 A1 | 9/2003 |
| JP | 2003-266085 A1 | 9/2003 |
| KR | 10-0343972 B2 | 7/2002 |
| KR | 10-0566761 B1 | 3/2006 |
| SU | 940 829 A1 | 7/1982 |

* cited by examiner

*Primary Examiner* — Matthew O Savage
(74) *Attorney, Agent, or Firm* — Burr & Brown (57) ABSTRACT

The present invention provides an upward-flow manganese contact column for feeding raw water to a manganese catalyst-packed layer through a plurality of dispersion nozzles provided at the upper surface of a chamber by forming the chamber for allowing raw water to flow in at the bottom of a column body into which a granular manganese catalyst is packed. Each dispersion nozzle has an umbrella portion above a perpendicular nozzle body, and the umbrella portion is configured so that the lower end of the umbrella portion is elongated below the upper end of the nozzle body. Raw water is supplied to the entire manganese catalyst-packed layer from the lower end of the umbrella portion of each dispersion nozzle. It is capable, of exhibiting stable treatment ability for a long time by suppressing particles of the manganese catalyst from being worn by collisions of the particles.

8 Claims, 7 Drawing Sheets

PRIOR ART

UPWARD-FLOW MANGANESE CONTACT COLUMN

BACKGROUND OF THE INVENTION

1. Field of the Invention

The present invention relates to an upward-flow manganese contact column used for treating manganese-containing water.

2. Description of the Related Art

In a water treatment plant using underground water and ground surface water as water sources, tap water is sometimes darkened when raw water contains manganese ions. Accordingly, manganese sand has been used for removing manganese ions. In this method, manganese sand prepared by coating the surface of sand grains with manganese dioxide is packed in a tank, raw water is allowed to flow as upward-flow or downward-flow through a gravel layer under the sand layer with injection of chlorine, and manganese ions are removed from raw water by allowing manganese ions to precipitate as insoluble manganese by taking advantage of catalytic action of manganese dioxide.

However, it has been a problem in the related art that removal efficiency of manganese from raw water is low since manganese sand having a specific surface area of about 2 $m^2/g$ has been used. In addition, since the specific gravity of manganese sand is as low as 2.5 or less, the flow speed of raw water supplied to the manganese sand layer cannot be increased in order to prevent the sand from being washed away by the upward-flow. Consequently, the volume of the equipment per unit volume of treatment water becomes large.

The applicant of the present invention has developed a method for removing manganese ions using a manganese catalyst composed of β-manganese dioxide with a specific surface area of about 1.5 $m^2/g$ and a ceramic separation membrane, and acquired patent rights as Japanese Patent Nos. 3,705,590 and 3,786,885. The flow speed of upward-flow is increased as compared with related arts while the volume of equipment per unit volume of treatment water is decreased in this method for removing manganese ions, because the specific surface area of the manganese catalyst is large while the specific gravity thereof is as large as about 3.5.

Figure 7:
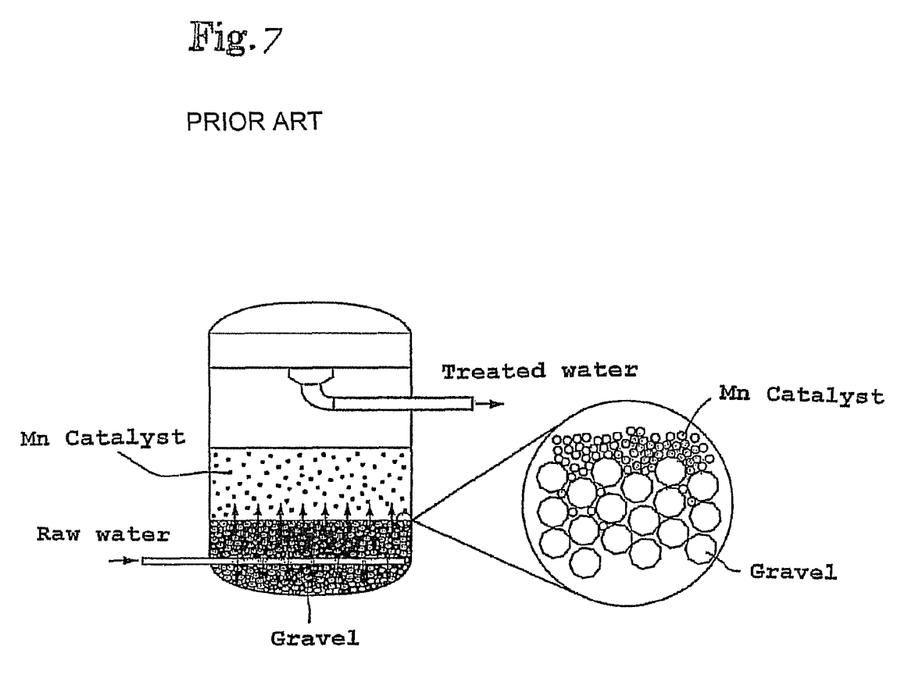
FIG. 7 is an explanatory view of a supporting gravel method in the related art.

However, when a layer packed with the manganese catalysts is formed on the gravel layer as in the related art, the manganese catalysts are sank into spaces between gravels due to large specific gravity of the manganese catalysts. As a result, manganese ions in raw water adhere to and grow on the surface of the gravels, which tend to be thickened. Therefore, the gravel layer is blocked to make it difficult to continuously operate the water treatment plant. This method (gravel supported method) is shown in FIG. 7.

Since the specific gravity of the manganese catalyst is large, there is a tendency that portions where raw water is readily spouted and portions where raw water is hardly spouted are formed due to a slight difference of pressure loss at the raw water spouting portions, and biased current is formed. Furthermore, particles of the manganese catalyst collide against one another at high speed when the flow rate of raw water at the raw water spouting portions is increased. Consequently, the surface of the catalyst is worn to reduce the amount of the manganese catalyst with a decrease of treatment ability, or the concentration of manganese ions increases in the effluent.

SUMMARY OF THE INVENTION

According to an aspect, of the present invention for solving the problems in the related art, there is provided an upward-flow manganese contact column capable of uniformly supplying raw water over an entire manganese catalyst-packed layer, capable of preventing the manganese catalyst-packed layer from being clogged and from forming biased flow, and capable of exhibiting stable treatment ability for a long period of time by suppressing particles of the manganese catalyst from being worn by collisions of the particles.

The upward-flow manganese contact column of the present invention for solving the above-mentioned problems is provided with a column body having a manganese catalyst-packed layer, a chamber formed at the bottom of the column body for allowing raw water to flow in, and many dispersion nozzles provided at the upper surface of the chamber for feeding raw water to the manganese catalyst-packed layer of the column body, wherein each dispersion nozzle has an umbrella part above a vertical nozzle body, and a, lower end of the umbrella portion is configured so that the lower end is elongated below an upper end of the nozzle body.

Each dispersion nozzle preferably has a mortar-shaped concave portion around the nozzle body, and is preferably configured so that raw water is supplied through a gap between the lower end of the umbrella portion and concave portion. Each dispersion nozzle preferably has a separator which is a vertical wall formed around or at both sides of the nozzle. The flow rate of raw water from the lower end of the umbrella portion is preferably in the range from 0.05 to 1.5 m/sec when raw water is supplied to the area surrounded by the separator at a rate from 1000 to 2500 m/day, and the nozzle body preferably has an orifice at the lower part thereof. The granular manganese catalysts are preferably made of β-manganese dioxide.

Since the upward-flow manganese contact column of the present invention is configured so that raw water is supplied to the manganese catalyst-packed layer from many dispersion nozzles provided at the upper surface of the chamber, raw water is uniformly supplied over the entire surface of the manganese catalyst-packed layer, and no biased flow is formed. Since each dispersion nozzle has the umbrella portion above the nozzle body so that the lower end of the umbrella portion is elongated below the upper end of the nozzle body in order to spout raw water from the lower end of the umbrella portion in the column body. Accordingly, fluidized granular manganese catalyst does not invade into portions lower than the lower end of the umbrella portion, and there is no possibility of falling the manganese catalyst down into the chamber through the nozzle body. In addition, since raw water supplied from the nozzle body is spouted into the manganese catalyst packed layer from the entire periphery of the lower end of the umbrella portion, the flow rate of raw water from the lower end of the umbrella portion is suppressed to 1.5 m/sec or lower to suppress the wear of the manganese catalysts caused by collisions of the particles of the manganese catalyst against one another at high speed.

DETAILED DESCRIPTION OF THE INVENTION

Preferred embodiments of the present invention will be shown below.

Figure 1:
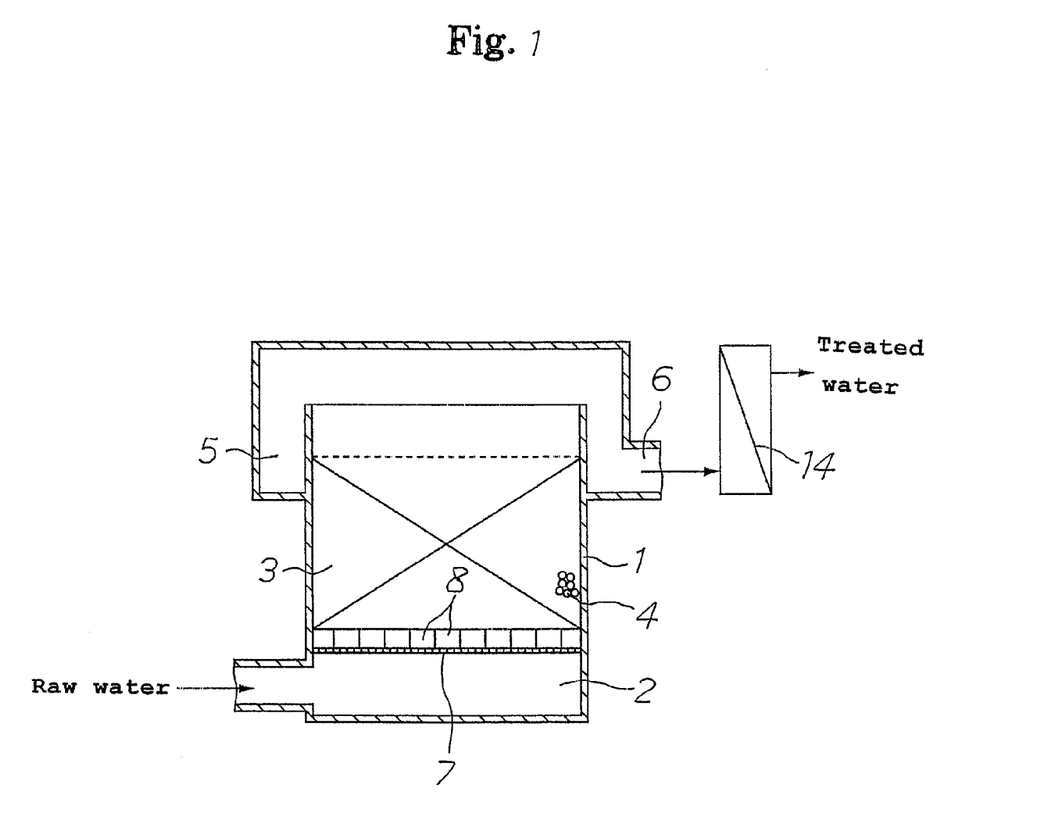
FIG. 1 is a cross-sectional view showing an entire configuration of an upward-flow manganese contact column of the present invention.

FIG. 1 is a cross-sectional view showing an entire configuration of an upward-flow manganese contact column of the present invention, where reference numeral 1 denotes a column body and reference numeral 2 denotes a chamber formed at the lower part of the column for permitting raw water to flow therein. A manganese catalyst-packed layer 3 is formed within the column body 1, and a granular manganese catalyst 4 made of β-manganese dioxide with a specific surface area of about 15 m$^2$/g and a specific gravity of about 3.5 is packed in the layer. The effective particle diameter of the granular catalyst is from 0.3 to 1.0 mm. Reference numeral, 5 denotes an overflow portion formed at the upper part of the column body 1, where treated water after passing through the manganese catalyst-packed layer 3 and overflowing from the upper end of the column body 1 is received by the overflow portion and is discharged out of a flow-out pipe 6.

Figure 2:
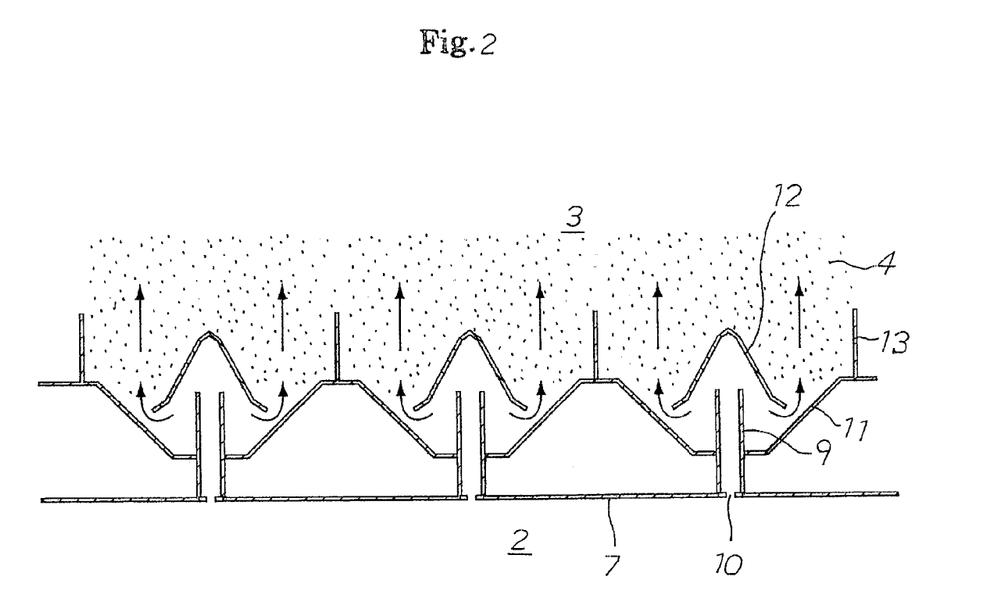
FIG. 2 is an enlarged cross-sectional view of a main part.

A plurality of dispersion nozzles 8 are provided on the upper surface of a horizontal plate 7 partitioning the chamber 2 from the manganese catalyst-packed layer 3. The dispersion nozzles 8 may be arranged in a grid or may be close-packed into a regular triangle. The diameter of one dispersion nozzle 8 is preferably from 70 to 500 mm when viewed on a plane. The manganese catalyst 4 in the manganese catalyst-packed layer 3 is always flowing as shown in FIG. 2 by the ascending stream spouted from the dispersion nozzle 8 without being blocked.

Figure 3:
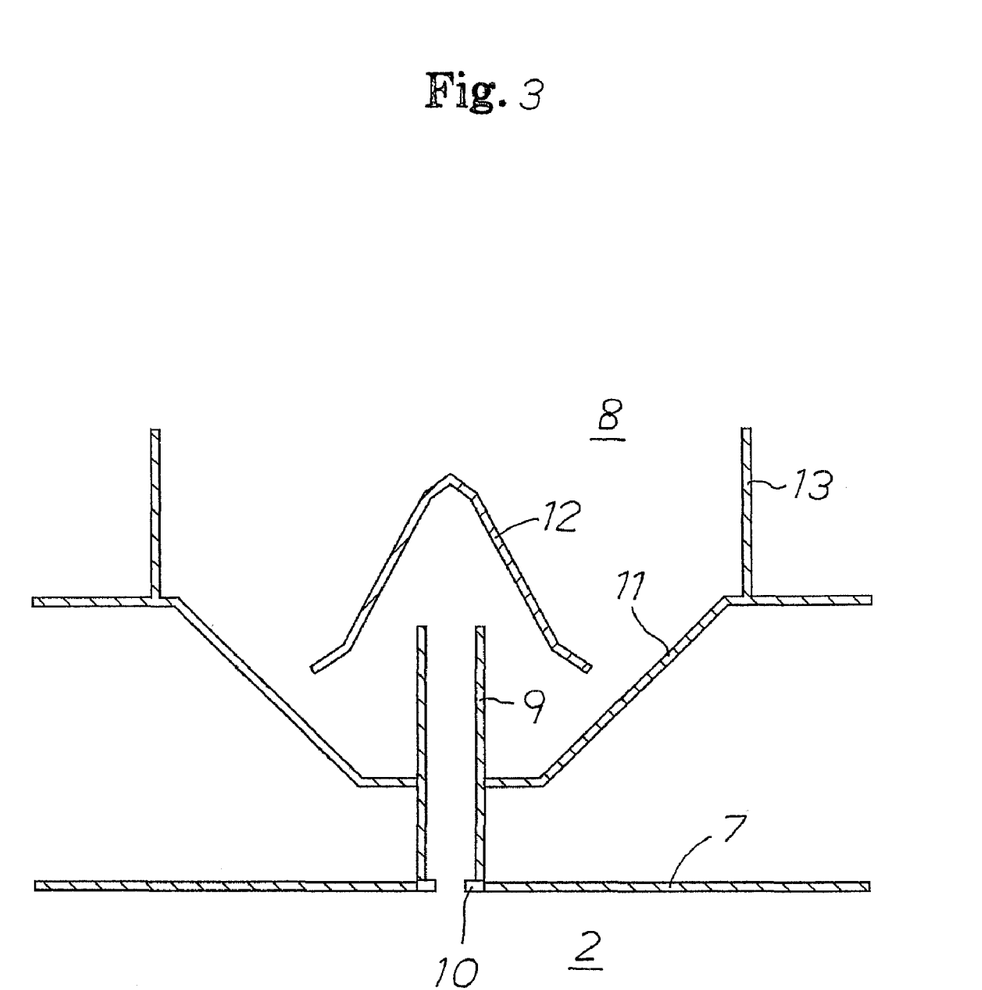
FIG. 3 is a cross-sectional view of a single dispersion nozzle.

The structure of the dispersion nozzle will be described below with reference to FIGS. 3 and 4. Each member constituting the dispersion nozzle 8 is made of a corrosion-resistant metal such as stainless steel or a resin such as PP, PE and PVC. Each dispersion nozzle has a cylindrical nozzle body 9 at the center. The diameter d1 of the aperture of the nozzle body 9 is designed so that the flow rate of spouting water is from 0.2 to 3 m/sec. An orifice 10 is preferably provided at the lower end of the nozzle body 9. The orifice 10 is provided so that raw water supplied in the chamber 2 is uniformly distributed to each nozzle body 9, and preferably has a pressure loss corresponding to 50 to 2000 mm of a water column.

A mortar-shaped concave portion 11 is provided at the outer circumference of the nozzle body 9, and an umbrella portion 12 is provided above the nozzle body 9 so as to be concentric with the nozzle body. An inner angle θ1 of the mortal shaped concave portion shown in FIG. 4 is preferably in the range from 15 to 60°. The mortar-shaped concave portion 11 is provided for guiding raw water upward. A separator 13 is formed at the outer circumference of the mortar-shaped concave portion 11 for partitioning the concave portion from the adjoining dispersion nozzle 8. While the separator 13 may be cylindrical, it is possible to dispose planar separators 13 only at the right and left sides of the dispersion nozzles 8 when the dispersion nozzles 8 are arranged in a grid. An appropriate height H of the separator 13 is from about 50 to 300 mm.

The umbrella portion 12 is substantially conical, and is fixed above the nozzle body 9 with a fixing means such as a fixing arm. Accordingly, raw water spouted out of the nozzle body 9 turns downward by colliding with the back surface of the umbrella portion 12, and flows out by being dispersed through the gap between the lower end of the umbrella portion 12 and the mortar-shaped concave portion 11. It is necessary for attaining this function to configure the lower end of the umbrella portion 12 so as to be elongated below the upper end of the nozzle body 9. The umbrella portion 12 also functions so as to prevent the manganese catalyst 4 from falling down through the inside of the nozzle body 9 by covering the upper part of the nozzle 9. Elongating the lower end of the umbrella portion 12 below the upper end of the nozzle body 9 is necessary for attaining this function.

When raw water is supplied to the area surrounded by the separator at a rate of 1000 to 2500 m/day, the flow rate of raw water from the lower end of the umbrella portion is preferably 1.5 m/sec or less, because wear of the manganese catalyst becomes evident due to high speed collision of the catalyst particles against one another when the flow rate exceeds the range described above. However, at least a flow rate of 0.05 m/sec is to be maintained for fluidizing the manganese catalyst 4. Accordingly, while a distance L1 of the gap between the lower end of the umbrella portion 12 and mortar-shaped concave portion 11 and the size of the umbrella portion 12 are determined so as to obtain the above-mentioned flow rate, a diameter d2 of the umbrella portion 12 is preferably from 50 to 300 mm.

Figure 4:
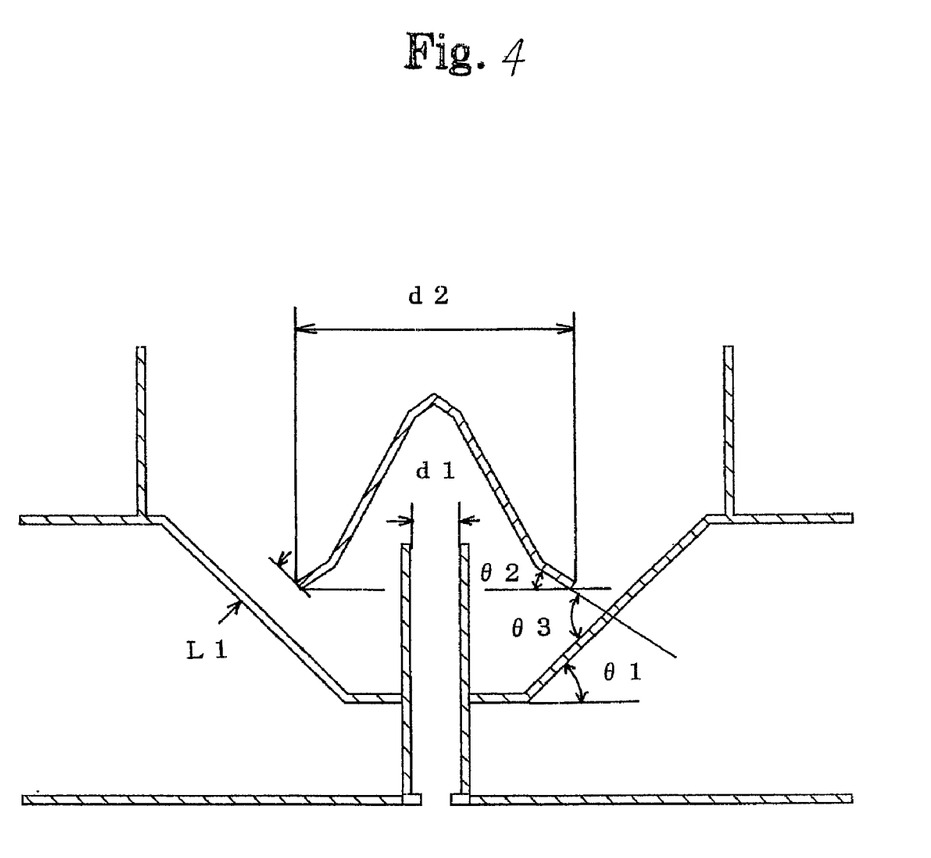
FIG. 4 is an explanatory view of dimensions of the single dispersion nozzle.

An angle θ2 at the lower end of the umbrella portion 12 shown in FIG. 4 is preferably from 1.5 to 60°, and an angle θ3 between the lower end of the umbrella portion 12 and mortar-shaped concave portion 11 is preferably from 30 to 120°. While the umbrella portion 12 has a two-step conical shape in which the lower end is expanded with a larger angle, it may also be a simple conical shape.

The upward-flow manganese contact column of the present invention has many dispersion nozzles 8 having the above-mentioned structure. Raw water containing manganese ions and suspended solids (SS) is supplied to the chamber 2, and spouted out of the nozzle body 9 by being uniformly dispersed into the dispersion nozzles 8. Raw water is spouted through the gap between the lower end of the umbrella portion 12 and mortar-shaped concave portion 11, ascends along the inner surface of the mortar-shaped concave portion 11, and flows through the manganese catalyst-packed layer 3 as an ascending flow. Manganese ions in raw water turn into insoluble manganese by being reduced by catalytic action of the manganese catalyst 4. A part of insoluble manganese adheres on the surface of the manganese catalyst 4, while the remaining manganese flows through the manganese catalyst-packed layer 3 together with SS to enter into the overflow portion 5, and is discharged through the flow-out pipe 6. Insoluble manganese and SS are separated and recovered with a ceramic filtration membrane 14 provided downstream of the contact column. Manganese ions and SS in raw water are thus removed.

Since raw water is evenly spouted out of the dispersion nozzles 8 in the upward-flow manganese contact column of the present invention, entire manganese catalyst 4 in the manganese catalyst-packed layer 3 is uniformly fluidized. Accordingly, the packed layer is not blocked due to thickening of the non-fluidized manganese catalyst as in the related art. Blocking of the manganese catalyst-packed layer 3 may be evaluated by the expansion coefficient (the height in fluidized state/the height in non-fluidized height) of the manganese catalyst-packed layer 3.

Figure 6:
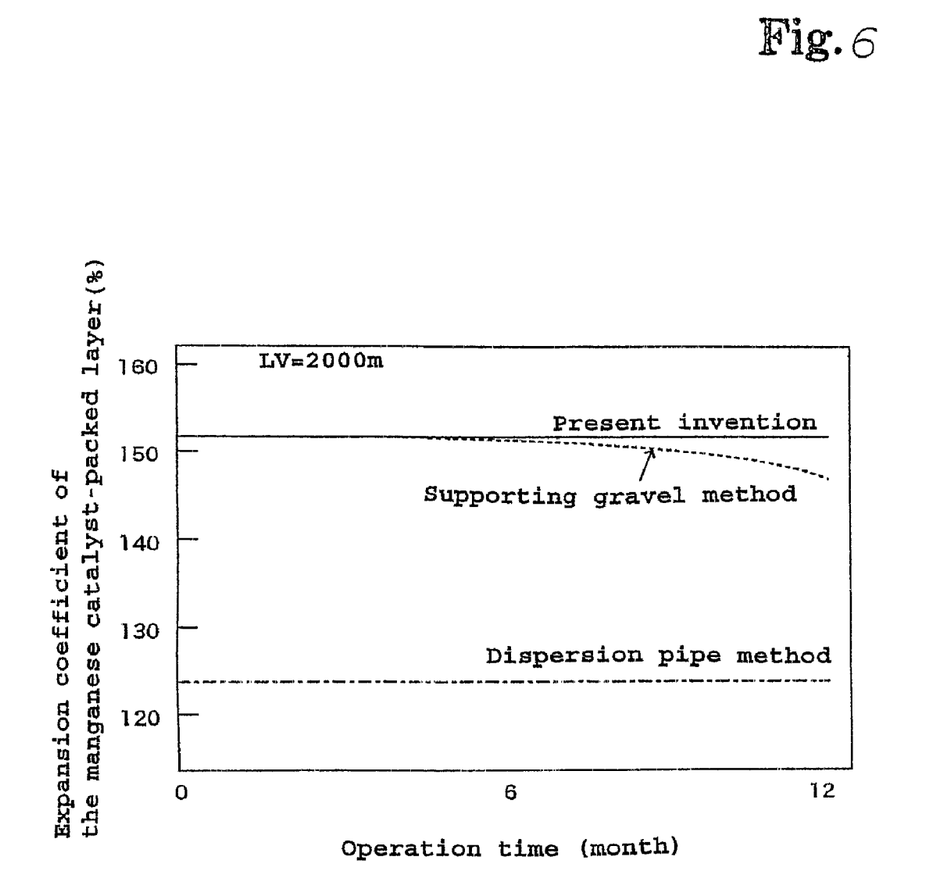
FIG. 6 is a graph showing a change of turbidity of treatment water immediately after a start of operation.

FIG. 6 shows the expansion coefficient of the manganese catalyst-packed layer 3 under continuous operation, where the expansion coefficient is about 124% in the dispersion pipe method in which dispersion pipes are disposed under the manganese catalyst-packed layer 3. On the other hand, the expansion coefficient exceeds 150% and the blocking level of the manganese catalyst-packed layer decreases in the supporting gravel method (FIG. 7) in which a gravel layer is provided under the manganese catalyst-packed layer and the dispersion pipes are disposed in the gravel layer and in the method of the present invention. However, in the supporting gravel method, the manganese catalyst that has fallen into the gravel layer may cause blockage due to thickening of the manganese catalyst, and the expansion coefficient gradually decreases 1 year after the start of operation of the system. Pressure loss for allowing raw water to flow through the manganese catalyst-packed layer also increases as the expansion coefficient decreases. For example, the pressure loss of 25 kPa at the initial stage was increased to 40 kPa 1 year after the start of operation. On the contrary, no changes in the expansion coefficient and flow pressure loss are observed in the method of the present invention.

Figure 5:
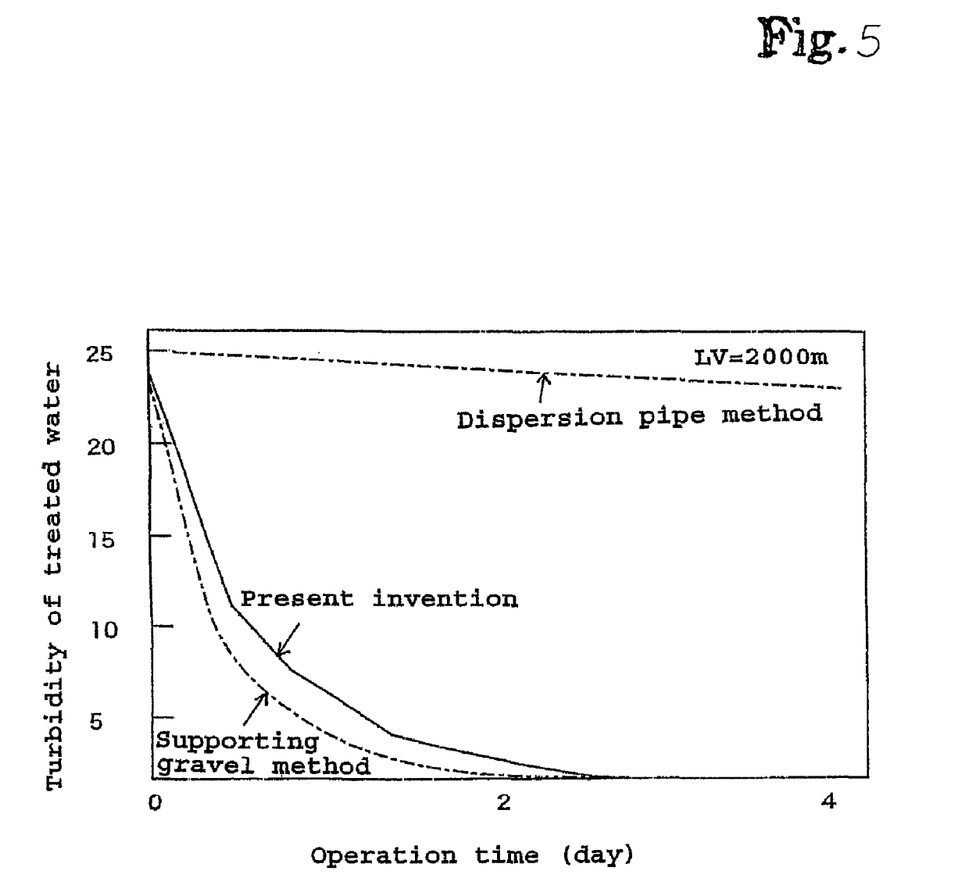
FIG. 5 is a graph showing expansion coefficient of a manganese catalyst-packed layer under continuous operation.

Turbidity of treated water decreases in the upward-flow manganese contact column of the present invention because the manganese catalyst is hardly worn. Fig. 5 is a graph showing the change of turbidity of treatment water immediately after the start of operation at LV=2000 m. Turbidity of treated water hardly decreases in the dispersion pipe method in which the dispersion pipes are disposed at the lower part of the manganese catalyst-packed layer since fine particles are suspended in water due to collisions of the particles of the manganese catalysts against one another. On the contrary, turbidity of treated water rapidly decreases due to fewer wear of the manganese catalyst in the supporting gravel method and in the method of the present invention.

What is claimed is:

1. An upward-flow manganese contact column comprising:
a column body having a manganese catalyst packed layer having granular manganese catalysts packed therein;
a chamber formed at the bottom of the column body for allowing raw water to flow into the chamber; and
a plurality of dispersion nozzles provided at an upper face of the chamber for feeding raw water to the manganese catalyst-packed layer, wherein each dispersion nozzle comprises an umbrella portion above a perpendicular nozzle body, wherein a lower end of the umbrella portion is configured to be elongated below an upper end of the nozzle body,
wherein each of the plurality of dispersion nozzles further comprises a mortar-shaped concave portion surrounding the perpendicular nozzle body, and is configured so that raw water is supplied through a gap between the lower end of the umbrella portion and mortar-shaped concave portion.

2. The upward-flow manganese contact column according to claim 1, wherein the nozzle body comprises an orifice at the lower portion thereof.

3. The upward-flow manganese contact column according to claim 1, wherein the granular manganese catalyst comprises β-manganese dioxide.

4. The upward-flow manganese contact column according to claim 1, wherein a flow rate of raw water from the lower end of the umbrella portion is adjusted to be from 0.05 to 1.5 m/sec when raw water is supplied to the area surrounded by the separator at a rate from 1,000 to 2,500 in/day.

5. An upward-flow manganese contact column comprising:
a column body having a manganese catalyst packed layer having granular manganese catalysts packed therein;
a chamber formed at the bottom of the column body for allowing raw water to flow into the chamber; and
a plurality of dispersion nozzles provided at an upper face of the chamber for feeding raw water to the manganese catalyst-packed layer, wherein each dispersion nozzle comprises an umbrella portion above a perpendicular nozzle body, wherein a lower end of the umbrella portion is configured to be elongated below an upper end of the nozzle body,
wherein each of the plurality of dispersion nozzles further comprises a mortar-shaped concave portion surrounding the perpendicular nozzle body, and is configured so that raw water is supplied through a gap between the lower end of the umbrella portion and mortar-shaped concave portion, and
wherein each of the plurality of dispersion nozzles further comprises a separator which is a vertical wall surrounding the umbrella portion of the dispersion nozzle.

6. The upward-flow manganese contact column according to claim 5, wherein a flow rate of raw water from the lower end of the umbrella portion is adjusted to be from 0.05 to 1.5 in/sec when raw water is supplied to the area surrounded by the separator at a rate from 1,000 to 2,500 in/day.

7. The upward-flow manganese contact column according to claim 5, wherein the nozzle body comprises an orifice at the lower portion thereof.

8. The upward-flow manganese contact column according to claim 5, wherein the granular manganese catalyst comprises β-manganese dioxide.

* * * * *

UNITED STATES PATENT AND TRADEMARK OFFICE
CERTIFICATE OF CORRECTION

PATENT NO. : 7,922,904 B2
APPLICATION NO. : 11/923830
DATED : April 12, 2011
INVENTOR(S) : Kiyotaka Sugiura, Hideki Takeuchi and Hiroyuki Oyachi It is certified that error appears in the above-identified patent and that said Letters Patent is hereby corrected as shown below:

Column 6

*Lines 14, 39 and 40*: please change "in/" to --m/--

Signed and Sealed this
Thirty-first Day of May, 2011

David J. Kappos
*Director of the United States Patent and Trademark Office*